United States Patent [19]

Blake et al.

[11] Patent Number: 4,513,016

[45] Date of Patent: Apr. 23, 1985

[54] NO-STIR DRY MIX WITH PUDDING NUGGETS FOR CAKE WITH DISCONTINUOUS PUDDING PHASE

[76] Inventors: Jon R. Blake, 6901 Regent Ave N., Brooklyn Center, Minn. 55429; Richard K. Knutson, 6948 Valley View Rd., Corcoran, Minn. 55340; Glenn J. VanHulle, 7608 Major Ave. N., Brooklyn Park, Minn. 55443

[21] Appl. No.: 433,074

[22] Filed: Oct. 6, 1982

[51] Int. Cl.$^3$ .............................................. A21D 13/08
[52] U.S. Cl. .................................... 426/554; 426/549; 426/555
[58] Field of Search ............................. 426/552–555, 426/579, 249, 453, 549

[56] References Cited

U.S. PATENT DOCUMENTS

| | | | |
|---|---|---|---|
| 3,026,205 | 3/1962 | Stone | 426/19 |
| 3,135,612 | 6/1964 | Hair et al. | 426/555 |
| 3,393,074 | 7/1968 | Ehrlich | 426/94 |
| 3,653,917 | 4/1972 | Wahba et al. | 426/555 |
| 3,694,229 | 9/1972 | Norsby et al. | 426/555 |
| 3,708,309 | 1/1973 | Johnson et al. | 426/555 |
| 3,713,845 | 1/1973 | Kuffel | 426/555 |
| 3,715,216 | 2/1973 | Wuhrmann et al. | 426/590 |
| 3,975,549 | 8/1976 | Shatila et al. | 426/550 |
| 4,021,582 | 5/1977 | Hsu | 426/99 |
| 4,073,951 | 2/1978 | Sargeant | 426/237 |
| 4,156,020 | 5/1979 | Bohrmann et al. | 426/96 |

OTHER PUBLICATIONS

Kander, The New Settlement Cook Book, Simon & Schuster, N.Y., 1954, pp. 363, 364 and 390.
Chemical Engineer's Handbook, Fifth Edition, ed. by R. H. Perry and C. H. Chilton, McGraw-Hill Book Co., 1973, pp. 8-57 to 8-65.
"Agglomeration Processes in Food Manufacture," Noyes Data Corp., 1972, pp. 202-221.

*Primary Examiner*—R. B. Penland
*Assistant Examiner*—Elizabeth A. King

[57] ABSTRACT

Disclosed are dry mixes for the provision of finished cakes, especially layer type, having a discrete and discontinuous pudding phase characterized by large sized pudding regions. The present dry mixes require no batter mixing or aeration but merely require the addition of measured amounts of water and baking. The present mixes comprise a cake component comprising a conventional full formulation dry mix for cakes in a particular physical form referred to as "granulated." Additionally, the mixes comprise a pudding component comprising a conventional instant pudding also in granulated form. The granulated pudding components have also been formed into larger sized pieces referred to herein as "nuggets." The granules of both the layer cake and pudding components are each essentially characterized by the physical features of (1) particle size, (2) bulk porosity, (3) density, (4) initial rates of moisture absorption, and (5) moisture content. Conventional agglomeration equipment and techniques employing moisture as the binding agent are useful herein for preparing the granulated pudding and layer cake fractions of the present invention. Providing the pudding component in the form of nuggets overcomes problems of insufficient rehydration in the provision of layer cakes with large pockets of a discontinuous pudding phase.

25 Claims, No Drawings

NO-STIR DRY MIX WITH PUDDING NUGGETS FOR CAKE WITH DISCONTINUOUS PUDDING PHASE

BACKGROUND OF THE INVENTION

1. Field of the Invention

The present invention relates to food products. More particularly, the present invention relates to dry culinary mixes for the provision of baked goods, namely cakes, to finished cakes prepared from such mixes and to methods of preparing such finished cakes.

2. The Prior Art

The use of prepared mixes has received wide usage, particularly in home baking. These dry mixes provide convenience by eliminating the steps of ingredient selection, measurement and blending. To prepare cake batters from these dry mixes for baking, liquid materials such as water or milk, liquid shortening, eggs, etc. are added and the combination is then mixed to form a homogeneous mixture or batter and beaten to incorporate air. The resulting aerated batter is then typically transferred to a greased pan or tray and then baked to obtain finished cakes.

While these dry culinary mixes are convenient, it is apparent from the above description that the typical cake preparation procedure still contains several steps. It would be desirable then to eliminate one or more of these steps to provide products of even greater convenience. To this end, certain products have been marketed from time to time which attempt to provide greater convenience to the user. For example, one such product comprises previously hydrated batter. While somewhat more convenient, such products suffer from several disadvantages by virtue of the presence of water, e.g., limited shelf life, special storage requirements such as refrigeration, etc. These disadvantages have prevented these products from obtaining widespread acceptance. Accordingly, most art efforts then have been directed toward providing dry mixes for cakes and to improving both the use or characteristics of the dry mix or of the finished cake prepared therefrom. Dry mixes for cakes may be divided into two groups, namely, shortening-type mixes, e.g., layer cakes and non-shortening-type mixes, e.g., angel food cakes. While applicable to both types, the present invention has particular usefulness for shortening-type cake mixes. Shortening-type cake mixes contain, as major ingredients, flour, sugar, and shortening. To these major constituents other ingredients such as emulsifier, (generally incorporated into the shortening) starches, flavors, leavening, egg solids, non-fat milk solids may be added.

Greater convenience in using dry mixes can be provided by "full formulation" cake mixes. Full formulation mixes are distinguished from partial formulation mixes in that only water need be added for mixing and beating to form an aerated batter. Such full formulation mixes are commercially available and enjoy widespread acceptance particularly in the food service or commercial food industry.

Full formulation cake mixes, while convenient as regards time of mixing, nevertheless require the addition of prescribed quantities of water, blending at low speed to form a batter aeration and transfer to a coated baking container. Even greater convenience for the at-home preparation of layer cakes are provided by the "stir-in-the-pan" layer cake dry mixes. Typically, these are full formulation cake mixes which are specially formulated to be rapidly rehydratable and to be hand mixable. (See, for example, U.S. Pat. No. 3,694,229, issued Sept. 26, 1972 to N. Norbsy et al.) Certain cake mixes of this type contain agglomerated all-purpose wheat flour as a component to aid in the rapid hydration of the cake mix. (See, for example, U.S. Pat. No. 3,708,309, issued Jan. 2, 1973 to G. E. Johnson et al.) each of which are incorporated herein by reference. However, even these mixes must still be hand stirred to form a batter. Moreover, these cake mixes are typically marketed in combination with specially coated containers so that batters can be prepared in the baking pan and thereafter baked without the cake sticking to the pan.

Co-pending application (Ser. No. 409,204, filed Aug. 18, 1982 by J. R. Blake, R. K. Knutson and G. J. VanHulle) entitled "No-Stir Dry Mixes for Layer Cakes," and which is incorporated herein by reference, provides an improvement in full formulation culinary mixes. The improvement resides in providing full formulation cake mixes in a particular physical form, i.e., granules, which allow for the preparation of finished baked cakes without requiring the conventional steps of mixing to form a batter, aerating the batter, greasing or coating the baking container or transferring the aerated batter to the coated baking container.

Co-pending application (Ser. No. 409,204, filed Aug. 18, 1982, by J. R. Blake, R. K. Knutson, and G. J. VanHulle, entitled "No Stir Dry Mixes with Pudding Granules for Layer Cakes with Discontinuous Pudding Phase", provides still a further improvement to the novel layer cake granules in full formulation culinary mixes. The invention disclosed therein provides dry mixes for layer cakes in the form of granules additionally comprising a pudding component. It is disclosed therein that dry pudding compositions can also be prepared in the novel particular physical form of granules and that such granules can be combined with granulated layer cakes to be used for the preparation of a novel form of a finished cake. The dry mixes therein allow for a new form of finished cakes having a discontinuous and distinct phase of pudding in the form of small discrete pudding regions, e.g., 2-5 mm. Such dry mixes of the present invention additionally provide the convenience advantages of no mixing, aeration, etc.

Dry mixes for layer cakes are known which are characterized as containing pudding. Generally these mixes contain conventional layer cake formulations in terms of ingredients and their concentrations. These mixes additionally contain those ingredients which typically comprise instant pudding dry mixes, namely, sugar(s), flavorings and pregelatinized starch. As a rule, these extra ingredients, or extra levels of ingredients (e.g., sugar) are, however, typically uniformly blended with the other layer cake ingredients. Together, the mix ingredients are formed into a homogeneous batter with added liquids in conventional manner, aerated, baked, etc. to form finished layer cakes. These cakes are characterized, thus by having a homogeneous structure. The extra pudding ingredients modify the finished cake to provide enhanced moistness and a heavier character similar to that of pound cakes rather than the lighter, drier, more crumbly character of traditional layer cakes. In contrast, the novel finished cakes of Blake et al. contain discrete, distinct, or discontinuous regions of pudding more analogous to cream-filled cake desserts.

Of course, agglomeration is an old technique in the food art and a variety of food products are available in agglomerated form. Additionally, the food art is replete with agglomeration techniques. (See, for example, "Agglomeration Processes in Food Manufacture," by Nicholas Pintauro Noyes Data Corporation, 1972.) Generally, food products are agglomerated to improve one or more of several product attributes. First, food products have been agglomerated to improve aesthetics. For example, soluble coffee powders have been agglomerated primarily for product aesthetics. (See for example, U.S. Pat. No. 3,135,612, issued June 2, 1964 to E. R. Hair). Second, agglomeration has been more commonly used to provide products of improved material handling, e.g., pourability. Exemplary agglomerated products and methods include those described in U.S. Pat. No. 4,073,951, issued Feb. 14, 1978 to R. G. Sargeant. Most commonly, very large numbers of food products have been agglomerated in the past to enhance their solubility or dispersion characteristics in liquids. These products include flour, non-fat dry milk solids, cocoa, sugars, eggs, etc.

Exemplary products and methods of preparation are disclosed in U.S. Pat. No. 4,156,020, issued May 5, 1979 to Bohrmann et al.; U.S. Pat. No. 4,021,582, issued May 3, 1977 to J. S. Hsu; U.S. Pat. No. 4,016,337, issued April 5, 1977 to J. S. Hsu.

While these agglomerated products and methods have been used in the past for the provision of products exhibiting improved aesthetics, material handling and dispersability in liquids, it has been surprisingly discovered that agglomeration can be employed to provide pudding materials useful as ingredients in no-stir cake mixes and to novel forms of finished cakes prepared therefrom. In particular, the present granules for both layer cake and pudding components are much larger in size than those of other food products and thus the present dry mixes are referred to herein as having been "granulated."

Certain problems, however, still remain in the provision of cakes with discontinuous pudding phases. It would be desirable to provide cakes with discrete pudding regions of larger, i.e., greater than 5 mm., and thus more visible, sizes. However, merely increasing the size of the granules leads to certain problems. Larger granules take longer to rehydrate. If baked immediately, as would be more convenient, cakes prepared therefrom have hard spots resulting from incomplete rehydration. Also, the continuous cake region is adversely affected due to excess moisture stemming from the incomplete rehydration of the pudding fraction.

It has been surprisingly discovered that these problems can be overcome and thus the present invention provides a still further improvement in the art. In its product aspect, it has been surprisingly discovered that the pudding fraction can be fabricated into pieces having improved rehydration characteristics. These pieces are referred to herein as "nuggets." The present mixes containing a pudding fraction in the novel physical form of nuggets enable the realization of novel cakes with larger sized discontinuous pudding regions than heretofore possible. In its method aspect, the present invention pertains to methods of preparing such mixes and also to methods of preparing such finished cakes.

SUMMARY OF THE INVENTION

The present invention relates to dry mixes for layer cakes which can be used to obtain finished cakes having a discontinuous pudding phase in the form of large sized pudding regions. The dry mixes comprise a layer cake component or fraction and a pudding component or fraction each of which are in a particular physical form referred to herein as "granulated." The granulated pudding component has been formed into larger pieces or nuggets. The present invention provides mixes from which cakes can be conventionally baked but without requiring mixing to form a batter, batter aeration, coating the baking container, and transferring the aerated batter to the baking container.

The granules of both the layer cake component and the pudding component are essentially characterized by the physical features of (1) particle size, (2) bulk porosity (total void volume/total volume), (3) density, (4) initial rates of moisture absorption, and (5) moisture content.

The particle size of the present layer cake component granules essentially ranges from about 0.85 to 2.8 mm. The bulk porosity essentially ranges from about 0.50 to 0.64. The density essentially ranges from about 0.45 to 0.70 g./cc. The rates of initial moisture absorption essentially range (at 70° F., 21° C.) from about 0.055 to 0.075 gram of water per gram of mix per second (g./g.s.). The moisture content is desirably less than about 5% by weight.

The particle size of the present pudding fraction granules essentially ranges from about 0.9 to 3.35 mm. The bulk porosity essentially ranges from about 0.50 to 0.60. The density essentially ranges from about 0.5 to 0.7 g./cc. The rates of initial moisture absorption essentially range (at 70° F., 21° C.) from about 0.060 to 0.080 g./g.s. The moisture content is desirably less than about 5% by weight.

The pudding granules fraction is fabricated into nuggets comprising a sugar matrix by heating a sugar solution of from 70% to 95% sugars at 150° F. to 160° F. in a weight ratio of solution to granules of about 1:4 to 1:7.

Additionally, the present invention relates to a novel form of finished cake having a discontinuous pudding phase of enlarged pudding regions. In its method aspect, the present invention embraces methods for preparing such cake mix compositions as well as to methods of preparing such finished cakes therefrom.

DETAILED DESCRIPTION OF THE INVENTION

The improved dry mixes for cakes of the present invention can be used to provide novel finished cakes having a discontinuous pudding phase of enlarged pudding regions. Additionally, the improvement resides in part in the elimination of several previously-recognized-as-essential steps of finished cake preparation: namely, batter mixing, batter aeration and container greasing. The improved cake mixes comprise a cake fraction and a pudding fraction each of which are novel in physical form (referred to herein as "granules"). Granules of both the cake fraction and the pudding fraction are each characterized by (1) particle size, (2) bulk porosity, (3) density, (4) moisture content, and (5) initial rates of moisture absorption. The pudding component granules are formed into larger pieces referred to as nuggets. Each of these physical attributes as well as cake formulation, method of granule and nugget preparation, and composition use are described in detail below.

Throughout the specification and claims, percentages and ratios are by weight and temperature in degrees Fahrenheit, unless otherwise indicated.

A. Cake Fraction

A cake fraction is the principal component of the present dry mixes. Highly preferred for use herein as the cake fraction is a cake of the layer type. The present cake fraction can be supplied by conventional full formulation cake compositions. Full formulation cake mixes are well known in the art and such conventional full formulation is useful herein for fabrication into the present granules. The art is replete with compositions suitable for use such as are described in the U.S. Pat. Nos. 3,708,309 and 3,694,229 referenced above for layer cakes. Additional suitable layer cake formulations are given in U.S. Pat. No. 3,135,612, issued June 2, 1964 to E. R. Hair et al. Exemplary chiffon cake formulations can be found in U.S. Pat. No. 3,713,845, issued Jan. 30, 1973 to Kuffel. Useful angel food cake mixes can be found in U.S. Pat. No. 3,653,917. issued April 4, 1972 to Wahba et al.

Generally, such full formulation dry layer cake mixes comprise:
about 35% to 45% flour;
about 30% to 60% sucrose;
about 1% to 16% shortening;
and from about 0.3% to 10% chemical leavening agent.

Optionally, other selected ingredients, e.g., non-fat dry milk solids or whole egg solids, vitamins, flavors, starch, color, etc., can each comprise up to about 3% of the cake mix. Any emulsifiers employed are typically blended with the shortening and make up from about 0.70 to 0.90% of the cake mix fraction.

Since the present invention finds particular suitability for use in connection with layer cakes, the following description of the present invention generally refers to layer cakes. However, it is to be appreciated that as indicated above, the present invention contemplates other cake types as well.

1. Particle Size

As indicated above, the physical structure of the dry layer cake fractions of the present invention are distinct from the physical structures of cake mixes of the prior art. Importantly, the present cake mixes are provided with a layer cake fraction in the form of granules essentially characterized in part by particle size. The present cake granules essentially range from about 0.9 to 2.5 mm. in shortest dimension. Cake fraction granules within this desired size range can be supplied by granules having the following sieve screen analysis:

| Weight % | U.S. Standard Size |
|---|---|
| 100% | Through No. 6 |
| 0% | Through No. 20 |

Oversized granules are to be generally avoided since great difficulties exist in ensuring complete hydration of oversized granules. Deficient hydration of granules can undesirably result in finished cakes having hard spot defects.

Conversely, undersized granules are also to be generally avoided since difficulties can arise in uneven absorption of moisture due to the higher surface area of the smaller cake fraction granules. Differences in moisture absorption can lead to absence of cake phase homogeneity. Better results in terms of granule rehydration are obtained when the granules range in shortest diameter from about 1.4 to 2.0 mm. Cake fraction granules within this preferred size range can be supplied by granules having the following sieve screen analysis:

| Weight % | U.S. Standard Size |
|---|---|
| 100% | Through No. 10 |
| 0% | On No. 14 |

While particle size is an important physical feature of the present granules, it is the combination of physical features of the present granules which are important to their usefulness herein.

2. Bulk Porosity

Another essentially important physical feature characterizing the present layer cake fraction in granule form is "bulk porosity," or "void space," i.e., the total void volume/total volume of the granulated cake mix. It is intended that the consumer will pour a package of the present cake mix in granule form to an ungreased baking container. Thereafter, a measured amount of liquid, typically water, will be added directly to the pan, and then the mixture will be baked immediately thereafter. For proper rehydration and in situ batter formation during the early part of the baking cycle, it is important then that the volume of liquid added be approximately equal to the total void volume of the granulated mix.

Undesirable effects can result from deficiencies in granule bed water fill levels, i.e., when either the volume of liquid to be added exceeds or fails to equal the total void volume. If in excess, a top or overlayer of water will lie over the top surface of the granules. The granules may fail to completely hydrate during the baking cycle and form defects in the finished cake. Additionally, the specific volume of the finished cake may be undesirably decreased. If the volume of liquid addition is deficient, then the top layer of granules above the level reached by the added liquid may fail to rehydrate at all resulting in a charred top crust in the baked product.

Selection of specific bulk porosities will be influenced primarily by the weight percent of moisture desired to be added. Thus, for example, for a specific culinary mix formulation, it may be desirable to add sufficient water such that the combination prior to baking has a moisture content of 40% by weight. If such a mix is fabricated into granules according to the present invention having a bulk porosity of 0.50, having a density of 0.65, then 100 ml. of granules would weigh 65 g., and contain 50 ml. of void space. For a desired moisture content of 40%, about 43 ml. of water would need to be added to the granules and would approximately equal the total available void space. While not exact, this correlation is best with lower bulk porosities and higher densities. Generally, less water is added than what is theoretically required to fill the available void space as measured by the method described below. While not wishing to be bound by the proposed theory, the disparities are believed due to the surface tension of water which prevents it from quickly occupying the smaller void regions of high porosity and low density granules.

Of course, the bulk porosity will be influenced not only by the size but also by the shape of the granules. While in the preferred embodiments of the present invention the granules are spherical in shape, the present invention embraces other shapes both irregular and regular shapes, e.g., oval or ellipsoid.

A determination of bulk porosity as defined above is made as follows:

1. 100 Grams of granules are poured into a 100 ml. graduated glass cylinder. The volume it occupies=V., e.g., 25 ml.
2. 60 Milliliters of carbon tetrachloride are poured over the granules in the cylinder and allowed to stand until air bubbles no longer rise to the surface. The total volume of carbon tetrachloride and submerged granules equals $V_2$, e.g., 67 ml.
3. Bulk porosity is then calculated from these data, thus:

$$B.P. = \frac{\text{void volume}}{\text{total volume}} = \frac{V - (V_2 - 60)}{V}$$

$$\frac{\text{Volume of available voids } (25 - 7)}{\text{Total volume}} = \frac{18}{25} =$$

0.72 bulk porosity

The granules of the present invention desirably range in bulk porosity from about 0.55 to 0.64. Better results in terms of hydration control, i.e., avoiding a surplus or deficiency of moisture are obtained when the bulk density ranges from about 0.58 to 0.62.

3. Density

Another important physical feature of the present granulated layer cake fraction is density of the granules. Density control is important to realization of granules exhibiting desirable rates of moisture absorption. Granules useful herein have a density essentially ranging from about 0.45 g./cc. to 0.70 g./cc. Better results in terms of desired rehydration and water filling of the granular bed are obtained when the density ranges from about 0.50 to 0.60 g./cc.

4. Moisture Content

The moisture content is also an important feature of the present granules. The moisture content strongly affects the initial rate of moisture absorption as well as other features of the granules. It is essential that the moisture content of the layer cake fraction granules be less than about 5%. Better results in terms of finished cake grain texture and specific volume are obtained when the moisture content of the present layer cake fraction granules is less than about 4%. For best results, moisture contents of less than about 3% are desirable.

5. Initial Rate of Moisture Absorption

Still another important physical feature of the present granules is the initial rate of moisture absorption. The term "rate of moisture absorption" is defined as the speed at which the granules absorb water. Should this rate be too fast, the particles first contacted by the reconstituting liquid will absorb a disproportionate quantity of water resulting in an uneven distribution of water. Should the rate be too slow, the particles will not attain the desired degree of rehydration within the baking cycle and as a result, the finished cake will be a succession of watery areas, which were originally the voids, and heavy areas, with dry centers, which were originally the location of the dry granules. Ideally, the rate of absorption should be such that the rehydrating liquid will flow into all of the void areas in the consolidated mass before substantial swelling occurs during release of $CO_2$ from the leavening, each of which are dependent upon the temperature increase obtained during the baking cycle.

Suitable absorption rates, in terms of weight of water absorbed per dry weight of granules, are in the range of the aforementioned 0.055 to about 0.075 grams of water per gram of product per second. Although it is intended that the reconstituting liquid be added practically instantaneously, when the moisture absorption rate is substantially above 0.075 g./g.s., the water cannot be readily introduced at a rate fast enough to prevent non-uniform rehydration. Preferably, the granules have an initial absorption rate in the range of 0.055 to 0.060 g./g.s.

The determination of granule's initial moisture absorption rate is accomplished as follows. To 5 g. increments of dry granules in a shallow pan, is added an excess of water, i.e., 25 ml. Tests are conducted with water temperatures of about 70° F., (21° C.). After about 10 seconds, the excess water is poured off and measured. The total amount of water absorbed is corrected for the time interval and quantity of granules, and calculated and expressed in units of grams of water absorbed per gram of product per second or "g./g.s."

B. "Pudding" Component

The present dry mixes for layer cakes additionally comprise as an essential ingredient a pudding component in a particular physical form. The term "pudding" is used in its conventional sense in the food art to refer to sweetened soft food systems typically based upon starch as the gelling or viscosity building ingredient. The pudding component composition is an important feature of the present composition. Useful herein are those dry pudding compositions containing a cold water dispersible, i.e., pregelatinized starch. These dry mix pudding compositions are commonly referred to as "instant puddings". The art is replete with such compositions and the skilled artisan will have no problem with selecting suitable compositions for use herein. (See, for example, U.S. Pat. No. 3,332,785, issued July 25, 1967 to E. Kuchinke et al., U.S. Pat. No. 2,897,086, issued July 28, 1959 to E. A. Sowell et al., U.S. Pat. No. 2,927,861, issued Mar. 8, 1960 to H. J. Charie, and U.S. Pat. No. 3,914,456, issued Oct. 21, 1975 to Norsby et al.). Additionally, compositions containing a mixture of pregelatinized and ungelatinized starch are useful herein. Compositions containing exclusively ungelatinized starch are, however, not useful herein as the pudding component.

Typically, such instant pudding compositions comprise sugar, flavoring, and coloring agents, and either the combination of pregelatinized starch and setting agents, e.g., calcium or phosphate salts, or modified pregelatinized starch or combination of starches as the gelling agent. Numerous other optional ingredients for texture or other product property modification can be included, e.g., emulsifiers for dispersibility, soy protein for fortification, etc.

In the most preferred embodiment, the pudding component comprises from about 4% to 9% of a waxy maize pregelatinized starch, from about 60% to 85% sugar(s), from about 0.25% to 1.0% cold water soluble gum, and from about 0.005% to 0.015% of alpha-amylase. Other optional components, for example, non-fat dry milk solids, flavors, colors, etc. can be present from about 0.5% to 30% of the pudding fraction. Preferably, the pudding component comprises from about 6% to 8% starch, from about 65% to 75% sugars, from about 0.5% to 0.75% gum(s) and about 0.01% to 0.02% alpha-amylase. Such a pudding fraction formulation is especially suited to the provision of finished cakes having the highly preferred pudding regions of smooth and creamy texture.

Pregelatinized starch is a widely used material. Various starches are available originating from a variety of starch sources including tapioca, waxy maize, potato, wheat and the like.

Amylases are the enzymes which hydrolyze starch into reducing fermentable sugars, mainly maltose and dextrins. The amylases are classified as saccharifying (beta-amylase) and dextrinizing (alpha-amylase). Both enzymes are specific for alpha-glucosidic bonds which connect monosaccharide units into the large polysaccharides. Both alpha and beta amylases are widely available commercially and are produced from a variety of sources including malting of grains, production by fungi and bacteria and from pancreatin, primarily from pigs. U.S. suppliers of the desired alpha amylases include Worthington Diagnostics, Inc., (Division of Millipore, Corp.) Novo Industri, Enzymes Division, Bagsvaerd, Denmark, and Miles Laboratories, Inc.

Suitable cold water soluble gums include sodium and propylene glycol alginates, guar gum, locust bean gum, kappa carrageenan, gum Arabic, pectin, methylcellulose, hydroxypropyl methylcellulose and mixtures thereof. Preferred gums are selected from the group consisting of guar gum, locust bean gum and mixtures thereof.

Suitable sugars include conventional mono- and disaccharides including, for example, sucrose, dextrose, lactose, fructose, corn syrup solids, and mixtures thereof.

The amount of the pudding fraction is not critical. Good results are obtained when the pudding fraction ranges from about 10% to 30% of the dry mix. Preferably, the pudding fraction comprises from about 15% to 20% of the dry mix.

Of course, the present invention contemplates employing more than one pudding component granule in the present mixes. Thus, for example, multiple flavors and/or colors of pudding granules can be used in a single cake.

The particular physical form of the pudding fraction component is essential to providing the advantages of the present invention. The pudding composition is first granulated and then fabricated into larger sized pieces in prescribed manner. The physical form of the pudding granules are similar to that of the layer cake fraction granules.

1. Particle Size

Importantly, the pudding fraction is first formed into granules characterized essentially in part by a particle size of:

| Weight % | U.S. Standard Sieve |
|---|---|
| 100% | Through No. 10 |
| 100% | On No. 20 |

Stated otherwise, the particle size of the present pudding fraction granules range essentially from about 2.0 mm. to 0.85 mm. in shortest dimension. Better results in terms of ability to fabricate pudding granules into pudding nuggets as well as rehydration performance are obtained when the pudding granules range in size from about

| Weight % | U.S. Standard Size |
|---|---|
| 100% | On No. 16 |
| 100% | Through No. 12 |

Stated otherwise, the preferred particle size essentially ranges from about 1.7 to 1.18 mm.

Oversized granules are to be strictly avoided since great difficulties exist in ensuring complete hydration of larger granules. Deficient hydration of granules can undesirably result in finished cakes having hard spot defects. Conversely, undersized granules are undesirable since fabrication into granules is adversely affected.

2. Bulk Porosity

The bulk porosity of the pudding fraction granules essentially ranges from about 0.50 to 0.70. Better results in terms of nugget rehydration are obtained when the bulk porosity ranges from about 0.50 to 0.60. For best results, the bulk porosity is about 0.55 to 0.60.

3. Density

Desirably, the density of the pudding granules ranges from about 0.50 to 0.70. Better results in terms of nugget rehydration are obtained when the density ranges from about 0.5 to 0.65. For best results, the density should be about 0.55 to 0.60.

4. Moisture Content

The moisture content is an important feature of the pudding fraction granules for the same reasons as for the layer cake fraction granules. Desirably, the moisture content is then less than about 5%. Better results in terms of nugget rehydration are obtained when the moisture content has been reduced to less than about 4%. For best results, the moisture content should be less than about 3%.

5. Initial Rate of Moisture Absorption

The initial rate of moisture absorption is similarly important to the pudding fraction granules for reasons similar to that for the layer cake fraction granules. Desirably, the rate is about 0.060 to 0.075 g./g.s. Better results in terms of rehydration characteristics are obtained when the initial rate is about 0.065 to about 0.075 g./g.s.

METHOD OF PREPARATION

The present granules for both the layer cake and pudding fractions can each be prepared using conventional agglomeration apparatus and techniques. The art is replete with suitable methods and equipment. Preferred for use herein are those employing moisture as the binding agent. In particular, it has been found that a disc pelletizer such as Model 036 VD Stainless Steel manufactured by Ferro-Tech, Wyandotte, Michigan, is especially suitable for use herein. Another apparatus useful herein is a Schugi Flexomix 160 (manufactured by Schugi B.V., Amsterdam, Netherlands). An advantage of employing a disc pelletizer lies in the tight control over the particle size of the granules compared to other agglomeration apparatus and techniques.

The particular physical properties of the granules are adjusted in known manner by control of the operating conditions of the particular agglomerator. For the disc pelletizer, for example, operating parameters include angle of incline of the bed, bed depth, RPM of the disc, the rate of water addition and amount of water added per unit weight of dry mix. Other minor operating conditions include the position of the plow as well as the location of the dry feed addition and water spray. Particle size is controlled primarily by screening. However, yields of desirably sized granules are influenced by operating conditions.

Generally, bulk porosity is controlled by the extent of granule surface irregularity. Greater irregularity increases porosity. Increases in bulk porosity are obtained with steeper bed angle, shallower bed depth, faster RPM's, higher rates of water addition and lower unit water additions.

Similarly, higher densities are obtained with gentler bed angle, deeper bed depth, slower RPM's, lower rates of water addition and higher unit water additions.

Initial rates of moisture addition are primarily dependent upon final moisture content, but are also influenced by density and bulk porosity. Generally, higher rates are obtained when densities are lower and bulk porosities are higher.

In a typical manner of preparation, the ingredients for the full formulation layer cake are blended together to form a homogeneous mixture. Thereafter, the mixture is agglomerated at room temperature using water as the binding agent generally bringing the moisture content up to about 8–14%. Typically, both the dry particulate cake mixture or pudding fraction composition and the water are carefully metered into the disc pelletizer and tumbled. The dry particulate material is carried beneath a spray of water so that tiny agglomerates or seeds first form and then increase in size as rotation of the disc is continued, with the moistened particles being tumbled and rolled on the disc until granules of the desired size and other properties are formed and discharged from the disc. Thus, the particles on which water is sprayed, develop surface stickiness and agglomerate together while moving through a certain angular distance over the surface of the disc before falling back toward the lower rim of the disc. As rotation of the disc continues, the granules so formed rise to the surface of the particulate mix and overflow the rim when they have reached the desired size.

As is well known, the particle size of the granules as well as the other physical properties produced on a pelletizing disc is controlled by a number of factors, including the angle and speed of the disc, the position of the plows, the location of the dry feed addition and the water spray, and the rate of water addition. The specific conditions will vary with each dry mix formulation and can be readily established by routine experimentation. In accordance with the present invention, these factors are controlled to produce granules having a particle size such that the bulk of the granules will pass through a 6 mesh screen and will be retained on a 20 mesh screen, and will have a moisture content of about 10%–20%. Typically, the disc is inclined at an angle of about 45° and is rotated at a speed of about 15–25 RPM. The diameter of the disc used is commonly on the order of about 3 feet to 6 feet or more.

Thereafter, the granules formed are screened and over and undersized granules recycled. Subsequently, the granules are desirably dehydrated in conventional manner, e.g., with tray drying or vibrating bed drying each with forced hot air convection. The moisture content desirably is reduced to levels indicated above.

The pudding granules are made separately in a similar manner by blending the ingredients, agglomerating using moisture as the binding agent, classifying to obtain granules of desired particle size and dehydrating.

NUGGET PREPARATION

The pudding granules so provided are next essentially formed into nuggets according to the following method. The nuggets comprise pudding granules in a sugar(s) matrix. While not wishing to be bound by the proposed theory, it is speculated herein that the sugar matrix provide hydration pathways which accelerate rehydration of the granules. A heated sugar solution is prepared containing from about 70% to 95% sugar(s) solids. Suitable sugars include both mono- and di-saccharides including sucrose, glucose, fructose, dextrose, corn syrup solids, and the like. Preferred for use herein for cost considerations is a mixture of high fructose corn syrup and sucrose. Preferably, the sugar solution comprises from about 75% to 85% sugar(s) solids. About 80% solids is most preferred. The sugar solution is then heated to fluidize the solution to a temperature of about 140° F. to 180° F., (60° C. to 85° C.), preferably from about 150° F. to 160° F. (65° C. to 71° C.).

Thereafter, the heated sugar(s) solution is combined with the pudding granules. Desirably the solution is mixed with the granules in a weight ratio essentially ranging from about 1:4 to about 1:7. Preferably, the weight ratio ranges from about 1:5 to 1:6.

While still molten or fluid, the mixture of sugar enrobed pudding granules are then formed into nuggets of desired size and shape. Thereafter, the nuggets are allowed to cool and to form thereby the present nugget pudding pieces.

Suitable nugget forming techniques include manually filling into suitably sized and shaped molds. Also useful herein are equipment conventionally used to make sugar (sucrose) cubes for addition to hot beverages.

Nuggets useful herein can be so prepared ranging in size of up to about one inch squares. Preferred nuggets are ¾" cubes. Of course, various sized and shaped nuggets can also be used as desired.

Granules of various size and composition (for color and/or flavor variety) can be used to prepare the present pudding nuggets. Additionally, mixtures of nuggets of varying size and/or composition can also be used (e.g., chocolate nuggets and vanilla nuggets). Also, if desired, mixtures of nuggets and pudding granules can also be used as the pudding fraction of the present dry mixes (e.g., chocolate nuggets and cherry granules).

The cake mix fraction prepared as described above and the pudding fraction prepared as described can be blended together or packaged separately for use in blending as described below.

C. Adjuvants

In addition to the layer cake and pudding fractions, the present dry mixes can optionally contain a variety of additional ingredients suitable for rendering finished cakes prepared therefrom more organoleptically desirable. Such optional dry mix components include flavorings, e.g., chocolate shavings, nuts, fruit pieces, preservatives, vitamins and the like. If present, such optional components comprise from about 1% to 10% of the dry mixes of the present invention.

It is an unexpected advantage of the present invention that superiority in supporting non-soluble layer cake adjuvants is provided. Since a batter is formed only for a brief period during the baking cycle, less support for these materials is needed. Also, greater control over placement of such materials is possible since mixing can be eliminated. Relatively greater quantities of adjuvants can be added without fear of overloading the cake structure or settling of the added materials.

COMPOSITION USE

The present granulated dry mixes prepared as described above are conveniently prepared into finished cakes by a simple "pour-and-bake" operation. The cake mix is poured into an ungreased container and distributed evenly through the pan. Thereafter, a measured amount of water is added to the dry mix and is evenly distributed by gravity alone. The combination can then be, and preferably is, baked immediately thereafter in any conventional manner without prior mixing or aeration, for example, for 25 to 40 minutes at 350° F. to 425° F. (175° C. to 320° C.), or microwave heating for about 9 to 10 minutes at a rate of about 0.5 to 1.0 watt/g.

If separately packaged, the layer cake and pudding fractions can be mixed or not as desired. If desired, separately packaged pudding nuggets can be placed in the baking container where desired. The pudding nuggets also can be more concentrated in one section, e.g., middle, so as to prepare finished cakes resembling creme filled convenience desserts, e.g., cupcakes.

During baking the granules of layer cake and pudding fraction nuggets rehydrate and form a batter in situ. While not wishing to be bound by the proposed theory, it is speculated herein that surprising elimination of greasing or otherwise providing the baking container with a non-stick coating results from the added water or other liquid forming the continuous phase and being in contact with the container during most of the baking cycle.

Of course, if desired, the consumer may ignore the advantages provided by the present cake mixes and use the mix in a conventional manner. The consumer could then beat the water and cake mix and pudding combination to form a batter and then to aerate the batter, transfer to a greased container and then bake as above. In such an instance, a heavier, more moist cake would result similar to a pound cake.

The present invention can be used to prepare finished cake products which either cannot be prepared by present cake preparation mixes and techniques or those which can be prepared only with great difficulty. For example, swirl cakes comprising a first region of one flavor and/or color cake, e.g., white and a second region of second flavor and/or color cake, e.g., chocolate, can be readily prepared by employing granules of two cake mixes. Since no stirring is required in the cake preparation, and since neither the granules nor the nuggets move during hydration, complex patterns in finished cakes can be easily realized. For example, cakes can comprise alternating thin layers of white and chocolate whether vertically or horizontally oriented. Similarly, the pudding component can be employed with considerable freedom. Multiple pudding component flavors and colors can be used. Swirl or other patterns for the pudding component can also be realized.

The finished cakes prepared from the present dry mixes surprisingly are characterized by a discontinuous pudding phase. Generally, the finished cakes contain large pockets or regions, e.g., between about 5 to 30 mm. in diameter, of pudding distributed through a continuous layer cake phase.

The following examples are offered to further illustrate but not to limit the invention disclosed herein.

EXAMPLE I

A large batch of dry mix for a white layer cake in the form of granules of the present invention having the following formulation is prepared as follows:

| A. Cake Mix Fraction | | |
|---|---|---|
| Amount | Ingredient | Weight % |
| 789.00 lbs. | Sucrose (cake grind) | 39.450 |
| 735.00 | Flour | 36.750 |
| 200.00 | Shortening (plastic) | 10.000 |
| 94.68 | Dextrose | 4.734 |
| 40.00 | Shortening (solid) | 2.000 |
| 40.00 | Egg white solids | 2.000 |
| 20.00 | Egg yolk solids | 1.000 |
| 20.00 | Non-fat dry milk solids | 1.000 |
| 37.00 | Leavening | 1.850 |
| 16.00 | Salt | 0.800 |
| 4.00 | Vanilla powder | 0.200 |
| 2.32 | Color | 0.116 |
| 2.00 | Gum | 0.100 |
| 2,000.00 lbs. | | 100.000% |

| B. Pudding Fraction | | |
|---|---|---|
| Amount | Ingredient | Weight % |
| 567.00 lbs. | Sucrose (microse sized) | 56.700 |
| 105.10 | Dextrose | 10.510 |
| 181.20 | Cocoa | 18.120 |
| 71.40 | Non-Fat Dry Milk Solids | 7.140 |
| 70.20 | Pregelatinized Starch[1] | 7.020 |
| 5.00 | Gum[2] | 0.500 |
| 0.10 | Enzyme[3] | 0.010 |
| 1,000.00 lbs. | | 100.000% |

[1] A pregelatinized waxy maize starch available from National Starch Co., No. 78-0018.
[2] A guar-based gum available from National Starch as Dycol/4500FF.
[3] An alpha-amylase available from Novo Industri as T-60L.

The dry ingredients of each fraction are separately weighed and blended in a ribbon blender for five minutes. The heated (120° F.) shortening is then added with a piston pump. The mixture is then blended and delumped with a cake finisher.

Both the cake mix and pudding fractions are individually agglomerated in a similar manner. Each fraction is fed at a controlled rate of three lbs./min. to a 3 ft. (apx. 0.915 m.) disc pelletizer using a screw conveyor (Acrison, Inc. Model 1057). The disc pelletizer (Ferrotech Model 036) is operated at 17 RPM, a disc angle of 50° and a bed depth of about eight inches. Water is atomized onto the mix at a rate of 120 ml./min. About 85% of the granules so prepared range in size from about on No. 10 to on No. 14 U.S. Standard size mesh. The granules have a moisture content of about 9.5 to 12.5%. The granules are then dried in a forced hot air dryer at 110° to 120° F. (43° C. to 49° C.) for about 4 hours until a moisture content of about 3-4% is achieved.

The layer cake fraction granules are then screened so that about 98% range in size of from about 2.8 to 3.4 mm. The layer cake fraction granules so prepared are additionally characterized by a bulk porosity of 0.55, a density of 0.60, and an initial rate of moisture absorption of 0.060 gram of water per gram of granules per second.

The pudding fraction granules so prepared are similarly screened so that they are characterized by a particle size of about 1.7 to 1.18 mm. The granules are additionally characterized by a bulk porosity of 0.57, a density of 0.62, and an initial rate of moisture absorption of about 0.64 g./g.s.

The granules are fabricated into nuggets by admixing about 850 g. of granules in a small bowl with about 200 g. of a sugar syrup comprising about 85% by weight sucrose, heated to about 155° F. The mixture is packed into molds measuring about ¾"×¾"×¾" (apx. 19 mm.). After cooling, the nuggets so formed are removed from the mold.

635 Grams comprising one part pudding nuggets and three parts cake mix granules uniformly blended as prepared are added to a 9 in.×13 in.×2 in. (apx. 23 cm.×33 cm.×5 cm.) baking container. Then, 423 g. of water are added to the container. The mixture is then baked immediately at 350° F. (177° C.) for 20 to 25 min. to form a finished cake.

The layer cake so prepared is characterized by numerous discrete large sized regions of pudding randomly and uniformly dispersed throughout the cake.

EXAMPLE II

A small batch of dry mix chocolate layer cake in the form of granules of the present invention having the following formulation is prepared as follows:

| A. Cake Mix Fraction | |
|---|---|
| Amount | Ingredient |
| 383.90 g. | Sucrose[1] |
| 343.00 | Flour[2] |
| 115.00 | Shortening[3] |
| 40.00 | Dextrose |
| 25.00 | Pregelatinized starch |
| 20.00 | Cocoa |
| 20.00 | Dried egg whites |
| 12.50 | Dried egg yolk |
| 10.00 | Sodium bicarbonate |
| 8.00 | Salt |
| 11.50 | Flavor |
| 3.00 | Leavening acid |
| 1.00 | Gum |
| 7.10 | Color |
| 1,000.00 g. | |

[1] A mixture of granular sucrose and microfine sucrose of 50 microns (90% through a U.S. Standard Sieve No. 270). The weight ratio of granular sugar to microcrystalline sucrose is approximately 1:3.
[2] An all-purpose flour made from selected soft red winter wheats having a protein content of 8 to 10% by weight.
[3] Having a Solid Fat Index of approximately 22-26% at 70° F. and comprising about 10% by weight of the shortening of a food grade emulsifier comprising a mixture of mono and polyglycerol monoesters of stearic and palmatic acid marketed by Durkee Foods.

| B. Pudding Fraction | |
|---|---|
| Ingredient | Weight % |
| Sucrose | 68.178% |
| Dextrose | 12.880 |
| Non-fat Dry Milk Solids | 8.750 |
| Locust bean gum | 0.610 |
| Pregelatinized starch | 8.570 |
| Enzyme | 0.012 |
| Vanilla flavor | 1.000 |
| | 100.000% |

About 1,000 g. of the ingredients of each fraction are weighed and the dry ingredients of each fraction blended together in a mixing bowl. The shortening is added to the cake mix fraction slowly with low speed mixing until only about 25% of the mix is retained on a No. 10 screen (about 6 to 10 minutes). The cake mix is then delumped in a laboratory sized vertical cake finisher until the mix passes through a No. 10 screen.

1,000 Grams of each fraction is then separately transferred to a large mixing bowl for granulation. About 90 g. of room temperature water is slowly added by a pipette to each fraction at a rate of roughly about 20 g./min. while stirring the fraction with moderate agitation to evenly wet the fraction. The granules so prepared are dried at 120° F. (40° C.) for about 6 hours. The moisture content is then about 3%.

The layer cake fraction granules are then screened. A sieve screen fraction (about 60% of the granules) having the following analysis is selected:

| Through No. 10 | 100% |
|---|---|
| On No. 14 | 100% |

The over and undersized granules are then reworked by grinding to pass through a No. 50 screen and then repeating the granulation step above until having the desired sieve screen analysis.

The layer cake granules so prepared are additionally found to have a bulk porosity of 0.58, a density of about 0.56 g./cc. and an initial rate of moisture absorption of about 0.065 g. of water per gram of granules per second.

Similarly, the pudding fraction granules are screened and/or reworked until the following analysis is obtained:

| Through No. 16 | 100% |
|---|---|
| On No. 12 | 100% |

The pudding fraction granules so prepared are additionally characterized by a bulk porosity of 0.62, a density of about 0.68 g./cc., and an initial rate of moisture absorption of about 0.66 g./g.s.

The pudding granules are fabricated into nuggets by combining about 1,200 g. of nuggets in a small bowl with about 320 g. of a sugar syrup comprising from about 65% sucrose and about 25% corn syrup (42 D.E., 20% moisture) heated to about 175° F. The mixture is packed into molds measuring about ½"×½"×½", (apx. 12.7 mm.). After cooling for about 20 minutes, the nuggets so formed are removed from the mold.

About 435 g. of the cake fraction granules so prepared and 200 g. of nuggets are added to a sized baking pan as in Example I. 350 Grams of water and 73 g. of skim milk (0.5% butterfat) are added to the mix. The mixture is then directly placed in an oven and baked at 350° F. (177° C.) for 25 minutes to form a finished baked layer cake.

A layer cake of substantially similar character is prepared when about one half of the layer cake granules of the present example are substituted with an equivalent amount of the granules of Example I.

What is claimed is:

1. A dry mix for cakes which requires no mixing or aeration prior to baking and which after baking forms a baked cake having a discontinuous pudding phase, comprising:
    A. from about 70% to 90% by weight of the dry mix of a layer cake component comprising flour, sugar, leavening and flavor in the form of granules, said granules having
        1. a particle size of from about 0.85 to 2.8 mm.,
        2. a bulk porosity of from about 0.50 to 0.64,
        3. a density of from about 0.45 to 0.70 g./cc., 4. an initial rate of moisture absorption of from about 0.055 to 0.075 g. of water per gram of cake component per second, and
5. a moisture content of less than about 5% based on said cake component, and;

B. from about 10% to 30% by weight of the dry mix of a pudding component in the form of nuggets, said nuggets comprising a matrix of sugar and pudding granules, said granules having
1. a particle size of from about 0.9 to 3.35 mm.,
2. a bulk porosity of from about 0.50 to 0.60,
3. a density of from about 0.5 to 0.7 g./cc.,
4. an initial rate of moisture absorption of from about 0.060 to 0.080 g. of water per gram of pudding granule per second, and
5. a moisture content of less than about 5% based on said pudding component, wherein the weight ratio of sugar to granules in the matrix ranges from about 1:4 to 1:7, and wherein the granules comprise sugar, flavoring and pregelatinized starch.

2. The dry mix of claim 1 wherein the cake component additionally comprises shortening and an emulsifier.

3. The dry mix of claim 2 wherein the cake component granules have:
A. a particle size of from about 1.4 to 2.0 mm.;
B. a bulk porosity of from about 0.58 to 0.62;
C. a density of from about 0.50 to 0.60 g./cc.;
D. an initial rate of moisture absorption of from about 0.055 to 0.060 g/g.s.; and
E. a moisture content of less than about 4%.

4. The dry mix of claim 3 wherein the cake component comprises about 75% to 80% by weight of the dry mix and the pudding component comprises about 20% to 25% by weight of the dry mix.

5. The dry mix of claim 4 wherein the pudding component granules have:
A. a particle size of from about 1.7 to 1.18 mm.;
B. a bulk porosity of from about 0.50 to 0.60;
C. a density of from about 0.5 to 0.65 g./cc.;
D. an initial rate of moisture absorption of from about 0.065 to 0.075 g./g.s.; and
E. a moisture content of less than about 4%.

6. The dry mix of claim 5 wherein the cake component granules have a moisture content of less than about 3%.

7. The dry mix of claim 6 wherein the pudding component granules have a moisture content of less than about 3%.

8. The dry mix of claim 7 wherein the cake component comprises a mixture of a first fraction of granules having a first color and a second fraction of granules having a second color.

9. The dry mix of claim 8 wherein the pregelatinized starch is a waxy maize starch and wherein the pudding fraction additionally comprises from about 0.25% to 1.0% of the pudding fraction of a cold water soluble gum and from about 0.005% to 0.015% of the pudding fraction of alpha-amylase.

10. The dry mix of claim 8 wherein the pudding component granules comprises a mixture of a first fraction of granules having a first color and a second fraction of granules having a second color.

11. The dry mix of claim 10 wherein the first cake component fraction has a first flavor and the second cake component fraction has a second flavor.

12. The dry mix of claim 11 wherein the first pudding component fraction has a first flavor and the second pudding component fraction has a second flavor.

13. The dry mix of claim 12 additionally comprising from about 1% to 10% by weight of adjuvant particulate materials.

14. The dry mix of claim 13 wherein the nuggets range from about 13 mm. to about 25 mm. in length.

15. The dry mix of claim 14 wherein the weight ratio of sugar to granules in the matrix ranges from about 1:5 to 1:6.

16. A method for preparing a finished cake of a layer type having after baking a discontinuous pudding phase, in the finished baked cake consisting essentially of the steps of:

A. providing a dry mix for cakes, said dry mix comprising
I. from about 70% to 90% by weight of the dry mix of a layer cake component comprising flour, sugar, leavening and flavor in the form of granules, said granules having
a. a particle side of from about 0.85 to 2.8 mm.;
b. a bulk porosity of from about 0.50 to 0.64;
c. a density of from about 0.45 to 0.70 g./cc.
d. an initial rate of moisture absorption of from about 0.055 to 0.075 of water per gram of cake component per second; and
e. a moisture content of less than about 5% based on said cake component, and,
II. from about 10% to 30% by weight of the dry mix of a pudding component in the form of nuggets, said nuggets comprising a matrix of sugar and of pudding granules, said granules having
a. a particle size of from about 0.9 to 3.35 mm.,
b. a bulk porosity of from about 0.50 to 0.60,
c. a density of from about 0.5 to 0.70 g./cc.,
d. an initial rate of moisture absorption of from about 0.060 to 0.080 g. of water per gram of pudding granules per second, and
e. a moisture content of less than about 5% based on said pudding granule; and wherein the weight ratio of sugar to granules in the matrix ranges from about 1:4 to 1:7, and wherein the granules comprise sugar, flavoring and pregelantinized starch;

B. hydrating said at the same time both the cake component granules and the pudding component nuggets in the absence of agitation by combining with sufficient moisture containing liquids to yield a moisture content of from about 35% to 45%; and, thereafter C. baking at from about 350° F. to 450° F. for from about 25 to 45 minutes to yield a baked cake having a discontinuous pudding phase.

17. The method of claim 16 wherein the cake component additionally comprises shortening and an emulsifier.

18. The method of claim 17 wherein the cake component granules have:
A. a particle size of from about 1.4 to 2.0 mm.;
B. a bulk porosity of from about 0.58 to 0.62;
C. a density of from about 0.50 to 0.60 g./cc.;
D. an initial rate of moisture absorption of from about 0.055 to 0.060 gram of water per gram of mix per second; and
E. a moisture content of less than about 4%.

19. The method of claim 18 wherein the pudding component granules have:

A. a particle size of from about 1.18 to 1.7 mm.;
B. a bulk porosity of from about 0.50 to 0.60;
C. a density of from about 0.50 to 0.65 g./cc.;
D. an initial rate of moisture absorption of from about 0.065 to 0.075 g./g.s.; and
E. a moisture content of less than about 4%.

20. The method of claim 19 wherein the cake mix component granules comprise a mixture of a plurality of fractions, each fraction having a distinguishing color.

21. The method of claim 19 wherein the cake component comprises about 75% to 80% by weight of the dry mix and the pudding comprises about 20% to 25% by weight of the dry mix.

22. The method of claim 20 wherein the pudding component granules comprise a mixture of a plurality of fractions, each fraction having a distinguishing color.

23. The method of claim 22 wherein each fraction has a distinguishing second flavor.

24. The method of claim 23 additionally comprising the step of arranging the granule fractions into a pattern.

25. The method of claim 23 additionally comprising the step of arranging the granule fractions in a random array.

* * * * *